(12) United States Patent
Todd et al.

(10) Patent No.: US 9,134,916 B1
(45) Date of Patent: Sep. 15, 2015

(54) MANAGING CONTENT IN A DISTRIBUTED SYSTEM

(75) Inventors: Stephen Todd, Shrewsbury, MA (US); John Daniel Hushon, Jr., Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 1324 days.

(21) Appl. No.: 11/863,585

(22) Filed: Sep. 28, 2007

(51) Int. Cl.
*G06F 17/30* (2006.01)
*G06F 7/00* (2006.01)
*G06F 3/06* (2006.01)

(52) U.S. Cl.
CPC ........ *G06F 3/0647* (2013.01); *G06F 17/30079* (2013.01)

(58) Field of Classification Search
None
See application file for complete search history.

(56) References Cited

U.S. PATENT DOCUMENTS

| 8,087,063 | B2* | 12/2011 | Martin et al. | 726/2 |
|---|---|---|---|---|
| 2006/0004818 | A1* | 1/2006 | Claudatos et al. | 707/101 |
| 2006/0271530 | A1* | 11/2006 | Bauer | 707/5 |
| 2007/0022087 | A1* | 1/2007 | Bahar et al. | 707/1 |
| 2007/0050361 | A1* | 3/2007 | Al-Masri | 707/7 |
| 2007/0083575 | A1* | 4/2007 | Leung et al. | 707/205 |
| 2007/0266059 | A1* | 11/2007 | Kitamura | 707/204 |

* cited by examiner

*Primary Examiner* — Sangwoo Ahn
(74) *Attorney, Agent, or Firm* — Krishnendu Gupta; Joseph D'Angelo

(57) ABSTRACT

Embodiments of the invention relate to implementing management policy in a computer system. The management policy may be applied to a first content unit by using metadata associated with first content unit to manage storage of or access to the first content unit. The metadata associated with the first content unit may be stored in a second content unit that includes in its content, an identifier that identifies the first content unit.

24 Claims, 7 Drawing Sheets

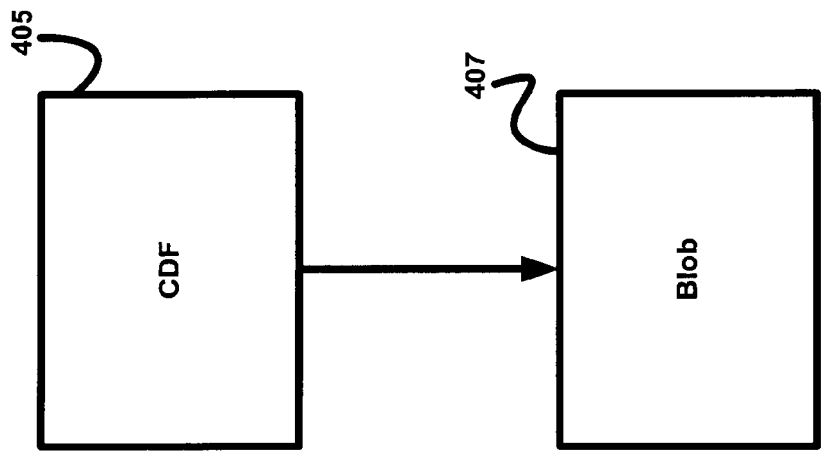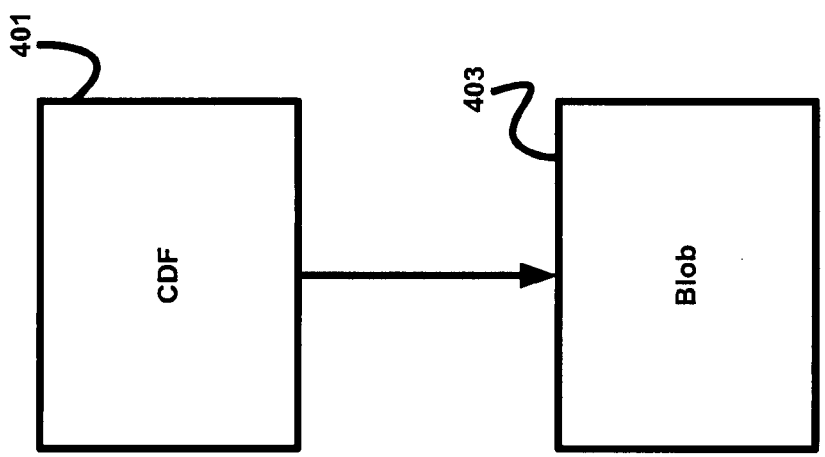
Figure 4

MANAGING CONTENT IN A DISTRIBUTED SYSTEM

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY OF THE INVENTION

One embodiment is directed to a method for use in a computer system having at least one management policy for managing access to and/or storage of a first content unit based on at least one attribute of the first content unit. The method comprises an act of: storing, in at least one second content unit on at least one object addressable storage (OAS) system in the computer system, metadata that specifies the at least one attribute used to manage access to and/or storage of the first content unit according to the at least one management policy, wherein the content of the second content unit further comprises an object identifier that identifies the first content unit. Another embodiment is directed to at least one computer readable medium, encoded with instructions that, when executed, perform the above-described method.

A further embodiment is directed to a method, in a computer system comprising a plurality of facilities each comprising an object addressable storage (OAS) system that stores a plurality of content units each identified via an object identifier that, from the perspective of a host computer that accesses content on the OAS system, is independent of any location at which the content unit is stored, of managing at least a first content unit from among the plurality of content units, wherein the plurality of content units further comprises a second content unit that comprises metadata associated with the first content unit and an object identifier for the first content unit. The method comprises acts of: receiving, at a first of the plurality of facilities, from a second of the plurality of facilities, one of the group consisting of: a score generated according to a first management policy that manages the first content unit using at least some of the metadata associated with the first content unit; and information usable by the first of the plurality of facilities to generate a score according to the first management policy; and implementing a management decision relating to the first content unit by evaluating the score.

Another embodiment is directed to an object addressable storage (OAS) system that stores a plurality of content units each identified via an object identifier that, from the perspective of a host computer that accesses content on the OAS system, is independent of any location at which the content unit is stored, that manages at least a first content unit from among the plurality of content units, wherein the plurality of content units further comprises a second content unit that comprises metadata associated with the first content unit and an object identifier for the first content unit. The OAS system comprising: an input; a controller, coupled to the input, that: receives, via the input, from another computer, one of the group consisting of: a score generated according to a first management policy that manages the first content unit using at least some of the metadata associated with the first content unit; and information usable by the OAS system to generate a score according to the first management policy; and implements a management decision relating to the first content unit by evaluating the score.

A further embodiment is directed to a method of managing a content unit in a computer system having at least one management policy for managing access to and/or storage of a first content unit based on at least one attribute of the first content unit. The method comprising acts of: receiving a request to compute a score for performing a management task related to the first content unit; accessing the at least one management policy; accessing a second content unit to determine the at least one attribute of the first content unit, wherein the content of the second content unit comprises an object identifier that identifies the first content unit; using the at least one management policy and the at least one attribute to compute the score.

BRIEF DESCRIPTION OF DRAWINGS

FIG. 4 is a block diagram of a CDF/blob architecture which may be used in some embodiments of the invention;

DETAILED DESCRIPTION

Embodiments of the invention relate to distributed computer systems, in which multiple separate computers that are in some, but not all, situations geographically dispersed and coupled by a network. In some computer systems the distributed computers are virtualized into a single unified virtual computer. In such distributed computer systems, the processing resources of the individual computers may be treated as a single pool of processing resources, and the storage resources of these computers may be treated as a single pool of storage resources.

Such distributed computer systems provide the benefit of allowing a task to be serviced by any available processing resources in the computer system (or the processing resources best suited to handling the task) and allowing data to be stored at any computer in the computer system that has capacity to store the data, or that is best suited to store the data based on other factors, such as available bandwidth, cost of storing the data, the size of the content, or any other suitable factor.

Figure 1:
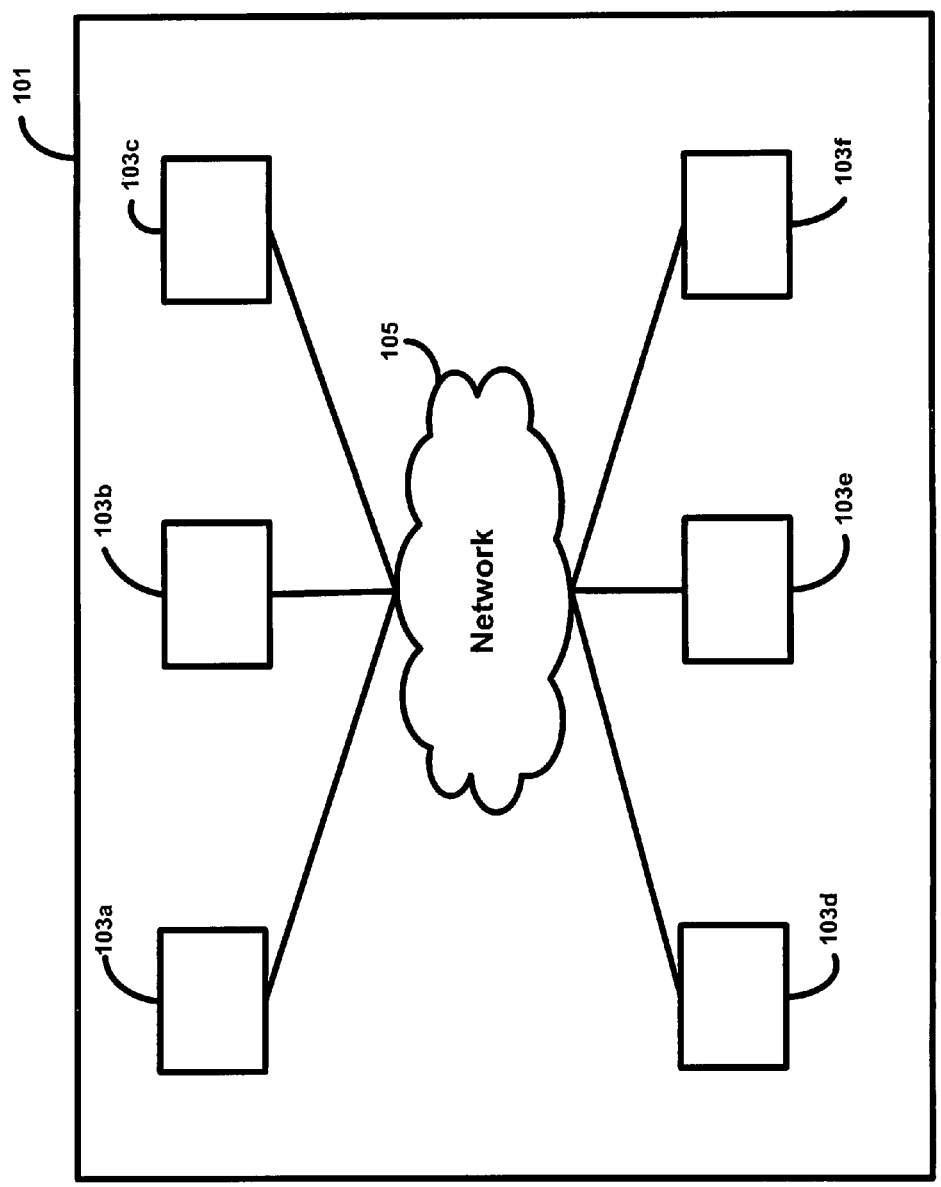
FIG. 1 is a block diagram of a distributed computer system.

An example of a distributed computer system is shown in FIG. 1. In FIG. 1, computing system 101 includes a plurality of computers (i.e., computers 103a, 103b, 103c, 103d, 103e, and 103f), each of which has its own processing and storage resources, coupled together via a network 105. Because the computers 103 together form a single computing system 101, any task that is initiated at one of the computers 103 ultimately may be handled by any one or more of the computers 103 including, potentially, the computer via which the task was initiated (or any other computer). Similarly, if a request to store data is received at one of the computers in computing system 101, the data may ultimately be stored on any one or more of the computers in the computing system. If a request to retrieve the stored data is subsequently received at one of the computers, the data may be retrieved and returned to the requestor from the computer that stores a copy of the data or any of the other computers in the system.

Implementing a distributed computer system presents a number of challenges. For example, when a request to retrieve stored data is received at a computer in the system, the storage resources in that computer system that store the requested data must be determined, even though the computer that received the request may not be a computer that currently stores the data, nor the computer that received the initial request to store the data. In addition, a request to access data typically includes some sort of identifier that identifies the data being requested. Non-distributed systems typically employ file systems for this purpose, wherein data is stored in files and each file is given a filename for identification. However, traditional filenames are ill suited to distributed systems because these filenames are local to the computer on which the data is stored. That is, with traditional file systems, a filename is only unique within a single computer (i.e., the computer on which the file system executes) and is not globally unique. Thus, if traditional file systems were used in a distributed computer system, two different files, each of which comprises different content and is stored on a different computer, may have the same file system pathname and filename. If a request is received to retrieve the file with that pathname and filename, there may be ambiguity as to which file is actually being requested.

Another challenge faced by designers of distributed computer systems is determining how to route content effectively within the computer system. That is, when a request to store content is received, a determination typically is made as to which computer or computers in the system should store the content and how many copies of the content should be stored in the system. In addition, when multiple copies of a data item are stored on different computers in the system, when a request to read the data item is received, a determination typically is made of from which of these computers to retrieve the data item.

Some embodiments of the invention may address some or all of the above-discussed challenges presented in distributed computer systems. However, the invention is not limited to addressing all or any of these challenges and, indeed, it should be understood that some embodiments may not address any of these challenges.

One embodiment is directed to a distributed computer system in which at least some of the computers in the computer system are object addressable storage (OAS) systems. In an OAS system, a content unit is identified via an object identifier that is independent of both the physical and logical location(s) at which the content unit is stored. An object identifier is different in this respect from a file system pathname or a block address in a logical volume because these types of identifiers are tied to a physical and/or logical location at which the content that they identify is stored.

By contrast, in an OAS system, from the perspective of a host computer (or application program or user) accessing a content unit on the OAS system, the object identifier does not control where the content unit is logically (or physically) stored.

Figure 2:
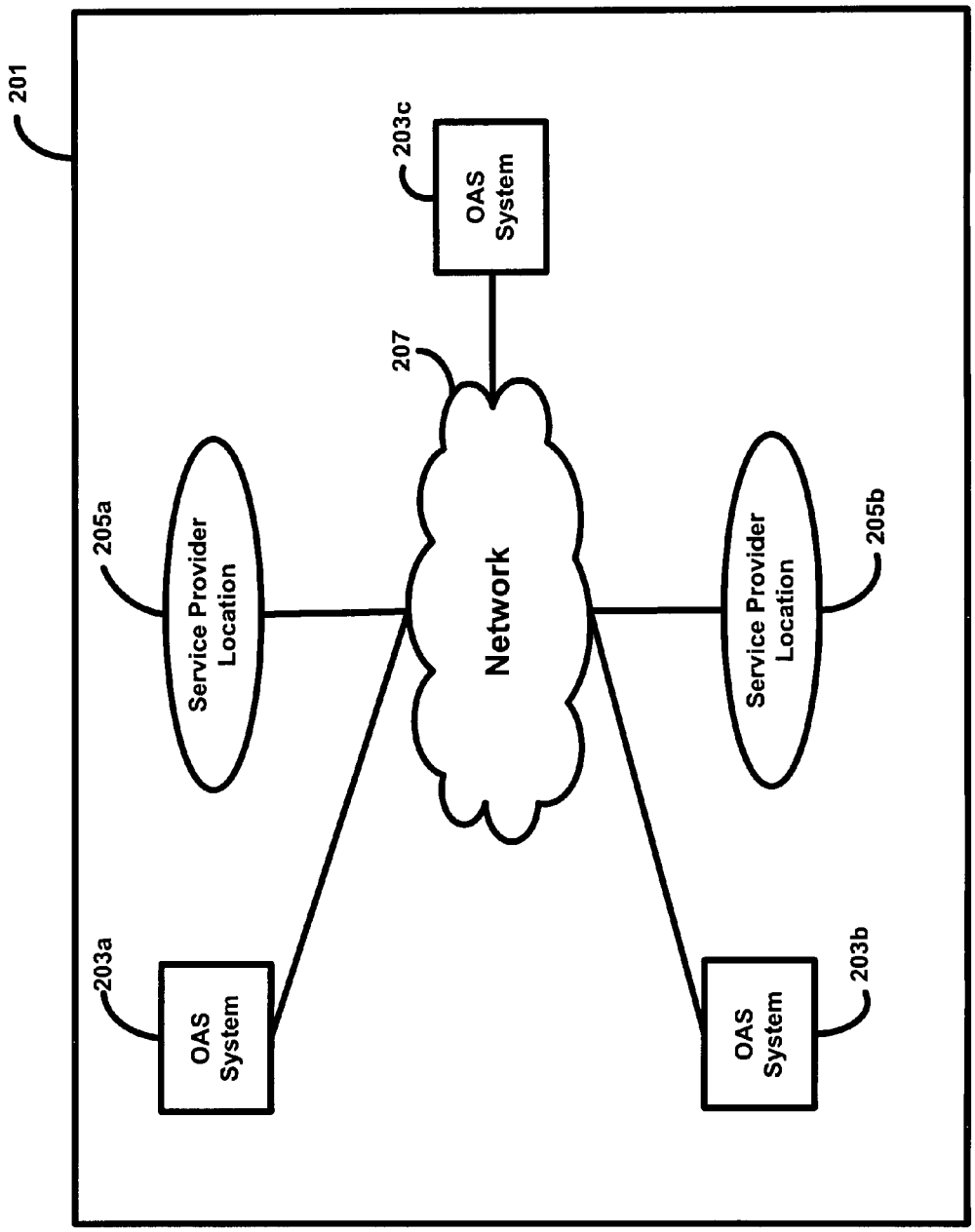
FIG. 2 is a block diagram of a distributed computer system in which at least some of the computers are Object Addressable Storage (OAS) systems with which some embodiments of the invention may be implemented.

An example of a distributed computer system in which at least some of the computers are OAS systems is shown in FIG. 2. In FIG. 2, computer system 201 comprises three OAS systems (i.e., OAS systems 203a, 203b, and 203c) and two service provider locations (i.e., service provider locations 205a and 205b). The OAS systems and service provider locations are coupled by network 207.

In the example of FIG. 2, each OAS system is a separate storage system with separate processing resources. Each service provider location may be a separate geographic location of a service provider. Each service provider location may have one or more computers (which may include one or more additional OAS systems (not shown)). These computers may be used to provide services to the other computers (e.g., OAS systems 203) in the computer system. For example, in some embodiments, the service provider's computers may have a large storage capacity, a large amount of available bandwidth, and a large amount of processing resources. Thus, the service provider may be better equipped to perform certain tasks that the individual OAS systems in the computer system. Any suitable services may be provided by the service provider, as the invention is not limited in this respect.

For example, in computer system 201 it may be desirable to be able to access a content unit stored on one OAS system from other computers and/or user locations in the computer system. However, servicing requests for the content unit at the OAS systems on which it is stored places a processing burden on these OAS systems in handling requests for the content unit from other OAS systems and/or users in the computer system. Thus, in some embodiments, service providers may be employed to serve content stored on the computers in the computer system. For example, a content unit initially stored on OAS system 203a may be sent (e.g., via network 207) to service provider location 205a for storage. If another computer (e.g., user location or OAS system) requests access to the content unit, it may be served from service provider location 205a, rather than OAS system 203a.

Serving content is one example of a service that may be provided by the service provider. However, any other suitable service may be provided. For example, in some embodiments the service provider may provide authentication and/or authorization services. That is, for example, when a request for a content unit is received, the service provider may authenticate the requestor and/or verify that the requestor is authorized to access the requested content unit.

As an example, each OAS system 203 in FIG. 2 may be located in a hospital at a different geographic location. For example, OAS system 203a may be located at Brigham and Women's Hospital in Boston, Mass., OAS system 203b may be located at Massachusetts General Hospital in Boston, Mass., and OAS system 203c may be located at Royal Perth Hospital in Perth, Australia. Service provider location 205a may be a service provider facility in Boston, while service provider location 205b may be a service provider facility in Perth.

Figure 3:
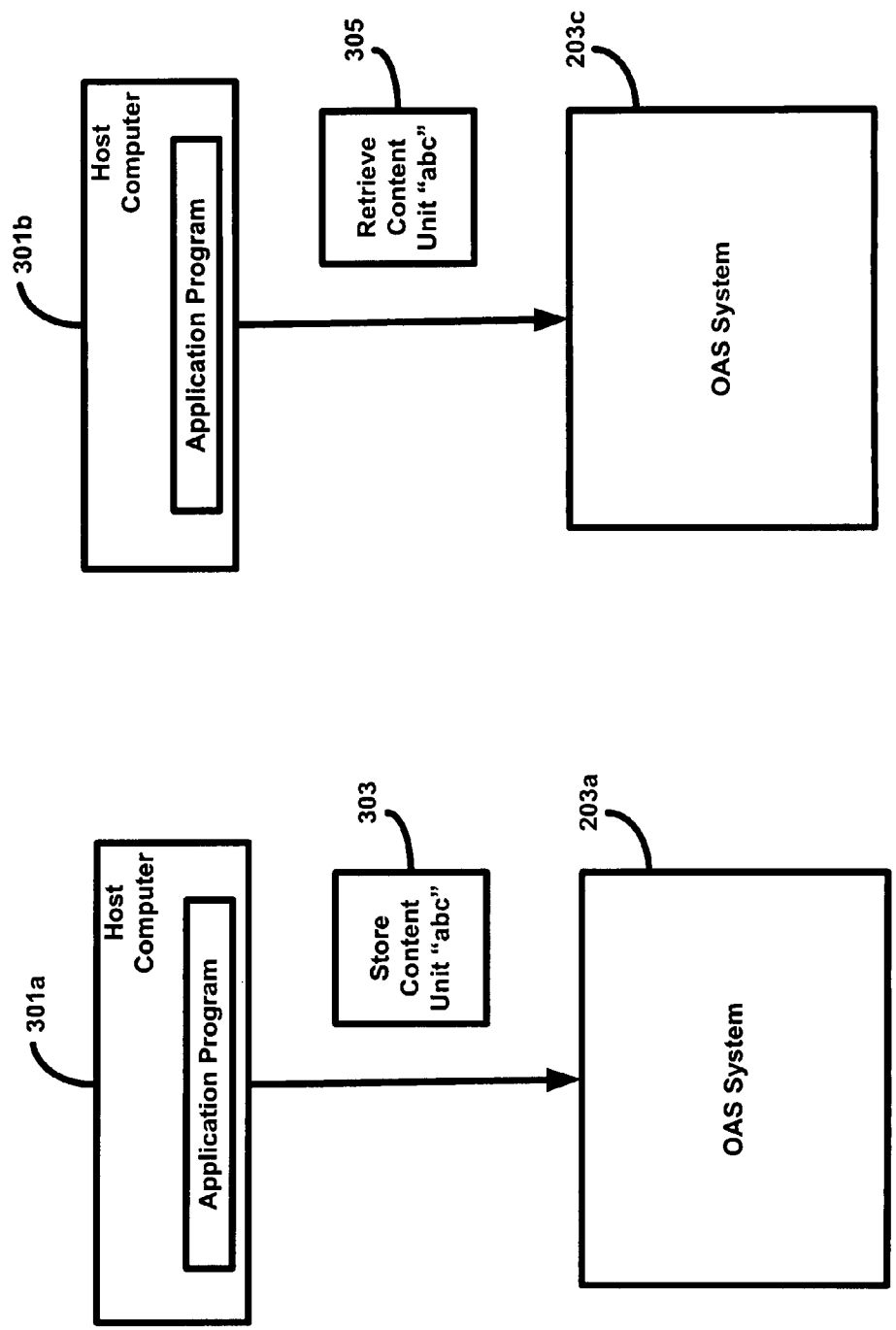
FIG. 3 is a block diagram of a computer system in which host computers store and retrieve content units from OAS systems in the computer system, in accordance with some embodiments of the invention.

It may be desired that a content unit that is initially stored on one of the OAS systems may be accessed from any other OAS system in the computer system. For example, as shown in FIG. 3, an x-ray of a patient may be taken at Brigham and Women's Hospital in Boston. An application program executing on a host computer (e.g., a medical application program used to view x-rays) may initiate a request 303 to OAS system 203a (located at Brigham and Women's Hospital) to store the x-ray as a content unit on the OAS system. The content unit may be assigned an object identifier "abc."

It should be appreciated that, in the example of FIG. 3, the request to store the content unit includes the object identifier for the content unit. That is, in the example of FIG. 3, the object identifier is generated at host computer 301a. However, the invention is not limited in this respect, as in some embodiments, the object identifier for the content unit may be generated by the OAS system and returned to the host computer in response to the request to store the content unit, or can be generated by any other suitable component in the computer system.

At some point after the content unit is stored on OAS system 203a, a radiologist (e.g., a radiologist assigned to evaluate the x-ray and provide his opinion) at Royal Perth Hospital in Australia may send a request 305 (e.g., via an application program executing on host computer 301b or otherwise) to OAS system 203c (located at Royal Perth Hospital) to retrieve the content unit that stores the x-ray. Request 305 may identify the requested content unit by its object identifier ("abc"). In this example, the radiologist requests access to the content unit by sending a request to OAS system 203c. However, the invention is not limited in this respect, as, for example, the request may be sent to directly to a service provider (i.e., without first being sent to OAS system 203c), or may be sent to another computer (e.g., a different OAS system) in the computer system.

It may be desired for OAS system 203c to return the requested content unit in response to the request, even though this content unit may not be stored on OAS system 203c. However, before OAS system 203c can return the content unit in response to the request, the content unit must be retrieved.

In some embodiments, the OAS systems in the computer system may be content addressable storage (CAS) systems. As discussed above, a content addressable storage system is a storage system in which content units are identified (in access requests to the storage system) using content addresses. A content address for a content unit is computed, at least in part, based on at least a portion of the content unit. Thus, in embodiments of the invention in which the OAS systems in a computer system are CAS systems, the object identifiers for a content units may be content addresses.

Embodiments of the invention relate to implementing management policies for content units stored in a distributed computer system. Such management policies may be used to manage access to and/or storage of content units in the computer system. For example, a management policy for a content unit may be used to determine how many copies of a content unit are to be stored in the computer system, where in the computer system to store the copies, which copy to retrieve in response to a read request for the content unit, and/or any other suitable management task.

In some embodiments, the management policy for a content unit may be implemented by associating with each content unit metadata that can be used to carry out the management policy. For example, a management policy for a content unit may specify that the location in the computer system at which copies of the content unit are stored may depend on the initial creation date of the content unit. That is, for example, it may be desired to migrate older content units to locations which have excess storage capacity (and therefore can store the content unit more cheaply) while keeping newer content units stored at their original storage location. This policy may be based on the assumptions that: (1) the newer content units are likely to be accessed more frequently than the older content units; and (2) that content units typically are stored in locations proximate to where to where they were created and from where they may be accessed most frequently so that such accesses can be processed most expeditiously by maintaining a newer content unit proximate to where it was created. Thus, metadata may be associated with the content unit that indicates its date of creation. This metadata may be used by the OAS system that stores the content unit or any other aspect of the system to implement one or more management policies for the content unit.

Applicants have appreciated that one challenge faced in implementing a management policy in a distributed computer system is that each computer in the computer system that performs a management task for a content unit should be able to access the metadata for the content unit that enables the computer to perform the management task. For example, a computer implementing the relocation policy described above may be unable to determine whether a content unit stored thereon should be migrated to another computer if it is unable to access the metadata for the content unit that specifies the initial creation date of the content unit.

Thus, in some embodiments, the metadata for a content unit is associated with its corresponding content unit in a such a way that it is either stored at the same location as the content unit, or is accessible to any entity that has access to the corresponding content unit.

In some embodiments, metadata may be associated with its corresponding content unit using a blob/CDF architecture. In such an architecture, there are at least two types of content units: blobs and content descriptor files (CDFs). Each blob has at least one CDF associated with it. A CDF stores metadata about the content stored in its associated blob(s) and also includes a pointer to its associated blobs. For example, as shown in FIG. 4, CDF 401 is associated with blob 403, and CDF 405 is associated with blob 407. CDF 401 stores metadata about the content stored in blob 403 and includes a pointer to blob 403, whereas CDF 405 stores metadata about the content stored in blob 407 and includes a pointer to blob 407.

In embodiments in which the blob/CDF architecture is implemented in an OAS system, each blob and each CDF may have a separate object identifier. The CDF may identify the blob(s) with which it is associated (i.e., for which it stores metadata) using the object identifier of these blobs. That is, the pointer from a CDF to a blob with which it is associated may be the object identifier for the blob (which may be stored, for example, in the content of the CDF).

In some embodiments, a blob may be accessed via its CDF. That is, for example, if it is desired to access a blob, the CDF for the blob may first be retrieved and the object identifier for the blob may be determined from the content of the CDF. In such embodiments, an attempt to access a blob may include an access of its corresponding CDF. Thus, any entity that accesses a blob may always have, along with the blob, its associated metadata. As a result, when a computer implements a management policy for a blob, it has the metadata of the blob available to evaluate in implementing the management policy for the blob.

In some embodiments, a CDF and blob may always be stored on the same computer, although the invention is not limited in this respect. Thus, if a blob is migrated from one computer to another in the distributed computer system, its CDF may also be migrated. Likewise, if a CDF is migrated from one computer to another in the distributed computer system, its associated blob(s) may also be migrated. Keeping a CDF and its associated blob(s) on the same computer may facilitate access to the blob when the blob is accessed via its CDF, as a computer that accesses the CDF need not retrieve the blob from a different computer.

Examples of systems in which a CDF/blob architecture is employed are discussed in some of the applications listed in Table 2 below. However, a CDF/blob architecture is only one example of a technique by which any computer in the distributed computer system may access the metadata for a content unit to perform management tasks on the content unit. The invention is not limited to this technique, as any other suitable techniques may be used. For example, in some embodiments, each content unit may be an X-Set according to the Storage Networking Industry Association (SNIA) proposed Extensible Access Method (XAM) standard. In the XAM standard, an X-Set is an object that includes data and metadata about the data. A detailed discussion of the XAM standard can be found on the SNIA web site at http://www.snia.org/xam/home.

As discussed above, in one embodiment, the metadata for a content unit may be used to implement a management policy for the content unit. Any suitable metadata may be provided, and any suitable management policy may be implemented, as the invention is not limited in either respect. Examples of metadata about a content unit that may be used to implement a management policy include a size of the content unit, a reproduction cost of the content unit, a number of copies of the content unit that are to exist in the computer system, a creation time for the content unit, and/or any other suitable metadata.

The reproduction cost of the content unit refers to the difficulty in recreating the content unit in the event it is lost. For example, if a content unit stores an electronic copy of a bank customer's bank statement for which a hard copy exists, the reproduction cost may be relatively low, because the electronic copy may be easily recreated from the hard copy. By contrast, if the content unit stores an electronic version of a patient's x-ray for which no hard copy exists, the reproduction cost may be relatively high, because recreating the x-ray may require the patient to submit to another x-ray and the new x-ray may different from the original x-ray if changes have occurred (e.g., if a broken bone has healed).

The metadata about the number of copies of a content unit that are to exist in the computer system may be used to determine the number of redundant copies of the content unit that are to exist in the computer system. That is, the distributed computer system may keep redundant copies of the same content unit for fault tolerance purposes. For example, if one copy of the content unit becomes corrupted or is unintentionally deleted, its content may be recovered from a redundant copy. In addition, keeping redundant copies of the same content unit in different locations in the distributed computer system may decrease the time for accessing the content unit, because a redundant copy may be stored at a computer that is in closer proximity to the requestor of the content unit.

The management policy and metadata for content units may be used to perform any suitable management task, as the invention is not limited in this respect. For example, in some embodiments, the management policy and metadata may be used to determine where to store a content unit in the computer system, whether to migrate a stored content unit to a different location in the computer system, which copy of a content unit to retrieve in response to an access request for the content unit, and/or any other suitable management task.

Making a management decision based on a management policy and metadata may be done in any suitable way, as the invention is not limited in this respect. For example, in some embodiments, the management policy may specify a way of computing a score for storing, serving, or taking some other action with respect to the content unit at each of one or more locations, and a management decision may be made based on the score(s). For example, when a request to store a content unit is received, it may be determined that the content unit may be stored by either a service provider in the United States or a service provider in India. The cost of storing a content unit at the service provider in the United States may be five cents for the first five megabytes and two cents for each addition megabyte, while the cost of storing a content unit at the service provider in India may be four cents per megabyte (regardless of the size of the content unit). Thus, metadata about the size of the content unit may be used to determine the least expensive location at which to store the content unit.

It should be appreciated that the "cost" of storing or serving a content unit may refer to the monetary cost charged by a service provider for providing the service of storing or serving the content unit, and/or may refer to a cost in terms of system resources consumed (e.g., storage space used, processing resources consumed, network bandwidth consumed, etc.).

Figure 5:
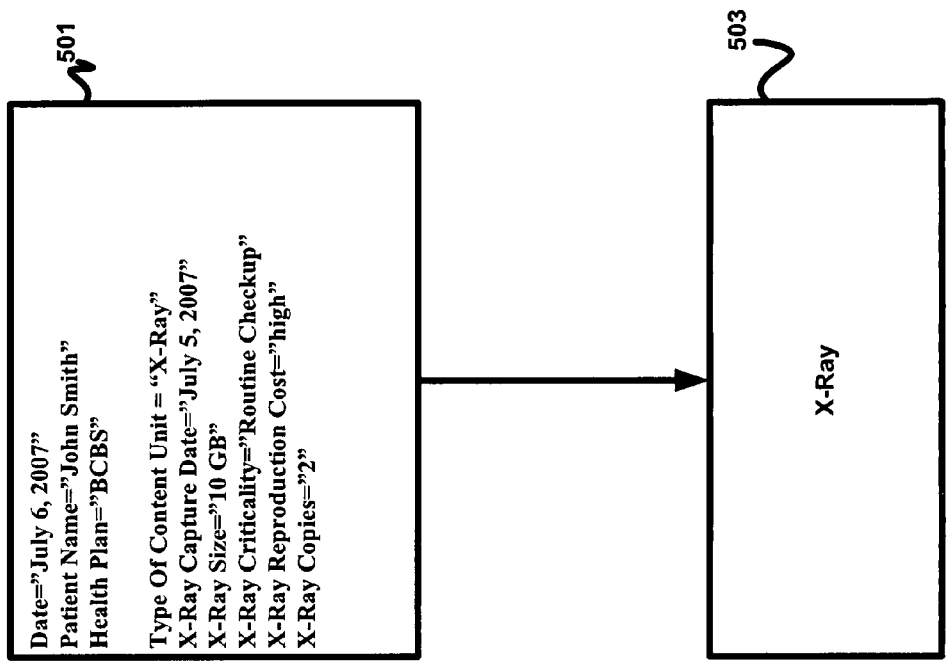
FIG. 5 is a block diagram of a blob and its associated CDF that includes metadata about the content of the blob, in accordance with some embodiments.

In some embodiments, a management policy may specify a way to compute a score for a content unit using the metadata. The score may be used to make a management decision regarding the content unit. For example, as shown in FIG. 5, an x-ray for a patient may be stored in content unit 503. CDF 501 may store metadata about the content unit, such as the date the content unit was created, the name of the patient, information about the patient's health insurance, the type of content unit, the date of capture of the x-ray, the size of the content unit, the criticality of the x-ray, the reproduction cost of the x-ray, the number of copies of the x-ray that are to exist in the system, and/or any other suitable metadata.

The management policy may specify a way to compute a score in any suitable way. For example, the management policy may specify the computation shown in Table 1 below:

TABLE 1

Score = (maximum bandwidth * size of content unit) + ((cost of storage * size ofcontent unit) * number of copies to exist in the computer system) − time elapsed since creation of content unit The management policy may be stored in any suitable location or locations in the computer system, as the invention is not limited in this respect. For example, in some embodiments, each computer in the system that stores a copy of a content unit may store the management policy for managing access to and/or storage of that content unit.

In addition, the management policy may be stored in any suitable way, as the invention is not limited in this respect. For example, in some embodiments, the management policy may be stored in a flat file on each computer that stores it. When a computer receives a request to compute a score for a content unit, it may access the management policy from the policy and determine what metadata about the content unit is to be used in computing the score. Then, the computer may obtain this metadata (e.g., from a CDF associated with the content unit, from a XAM X-Set, or in any other suitable way), and use the information in the management policy that specifies the manner of computing the score (e.g., the computation in Table 1) to compute the score.

Figure 6:
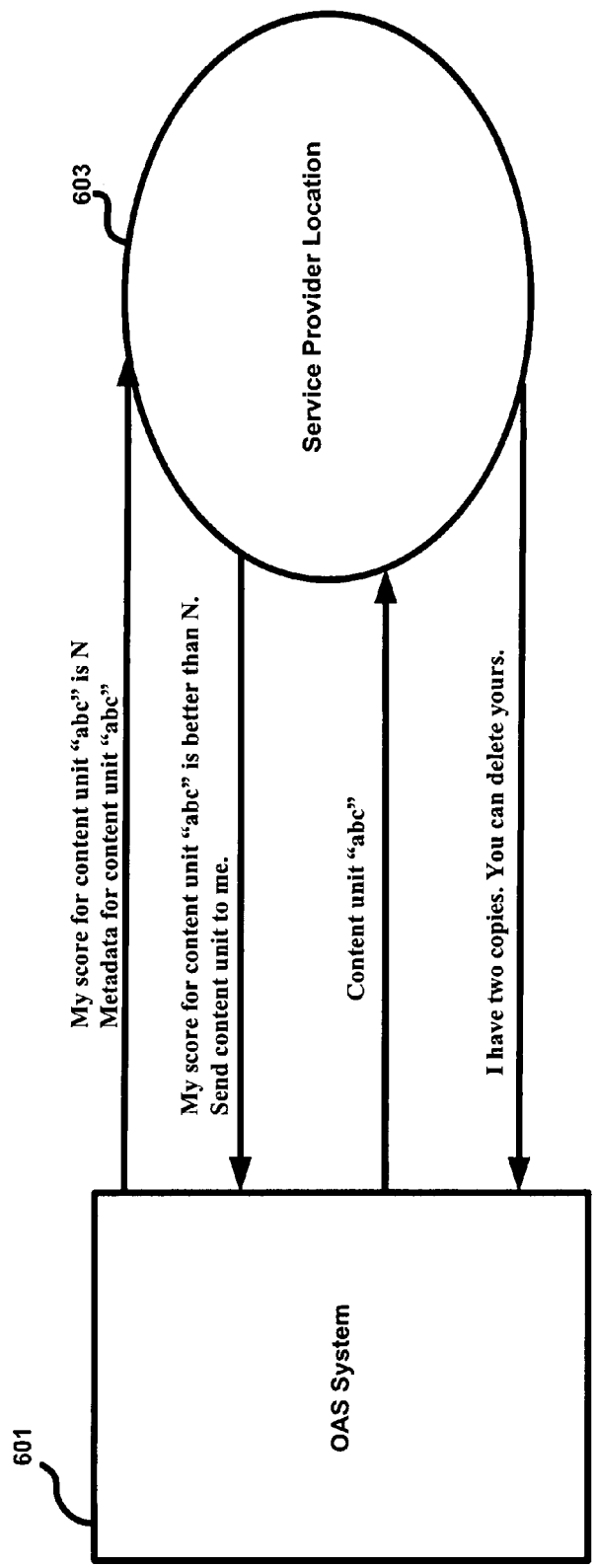
FIG. 6 is a block diagram of a system in which a content unit may be migrated from one location in a distributed computer system to another location in the distributed computer system based on a metadata about the content unit and a management policy, in accordance with some embodiments.

In some embodiments, the score may be computed at multiple different locations and the location with the best score may be selected to perform the task (e.g., store the content unit, return a content unit, or some other task). For example, as shown in FIG. 6, OAS system 601 may be an OAS system located at a hospital in Boston, and service provider location 603 may be a service provider location external to OAS system 601. OAS system 601 may store a content unit with the object identifier "abc," and may compute a score for this content unit using the management policy and the metadata for the content unit. OAS system 601 may then send this score to service provider location 603, along with the metadata for the content unit. The service provider location may then use this metadata and the management policy to compute its score for the content unit. These scores may differ because the maximum bandwidth and cost of storage at the location of the OAS system may be different from the maximum bandwidth and cost of storage at the service provider.

After service provider location 603 computes its score, it may determine whether its score is better than the score computed by OAS system 601 and, if so, send a communication to the OAS system indicating that it has a better score and request that the OAS system send the content unit to it.

In addition, the metadata of the content unit may indicate the number of copies of the content unit that are to exist in the computer system. For example, the metadata of the content unit may specify that two copies of the content unit are to exist in the computer system. In some embodiments, because the service provider location has determined that it is better suited to storing the content unit (i.e., based on its score computation set forth by the management policy), it may create an additional copy of the content unit so that it stores both copies of the content unit that are to exist. Thus, the service provider location may send a communication to OAS system 601 indicating that it stores two copies and that OAS system 601 may delete its copy, if desired.

In the example of FIG. 6, a score is computed at two locations in a distributed computer system. However, the invention is not limited in this respect, as there may be any number of suitable locations in the computer system at which the content unit potentially may be stored and a score may be computed at any subset of these locations or all of these locations.

The score computation shown in Table 1 takes into account the cost of storing a content unit at a location, as well as the cost of serving a content unit (i.e., bandwidth). However, this score computation is only one example, as a score computation could take into account only one of these factors, or could take into account other factors.

In addition, it should be appreciated that the score need not be a numeric value. Rather, the score may be any objective measure of the suitability of a location in the computer system for performing a task.

Figure 7:
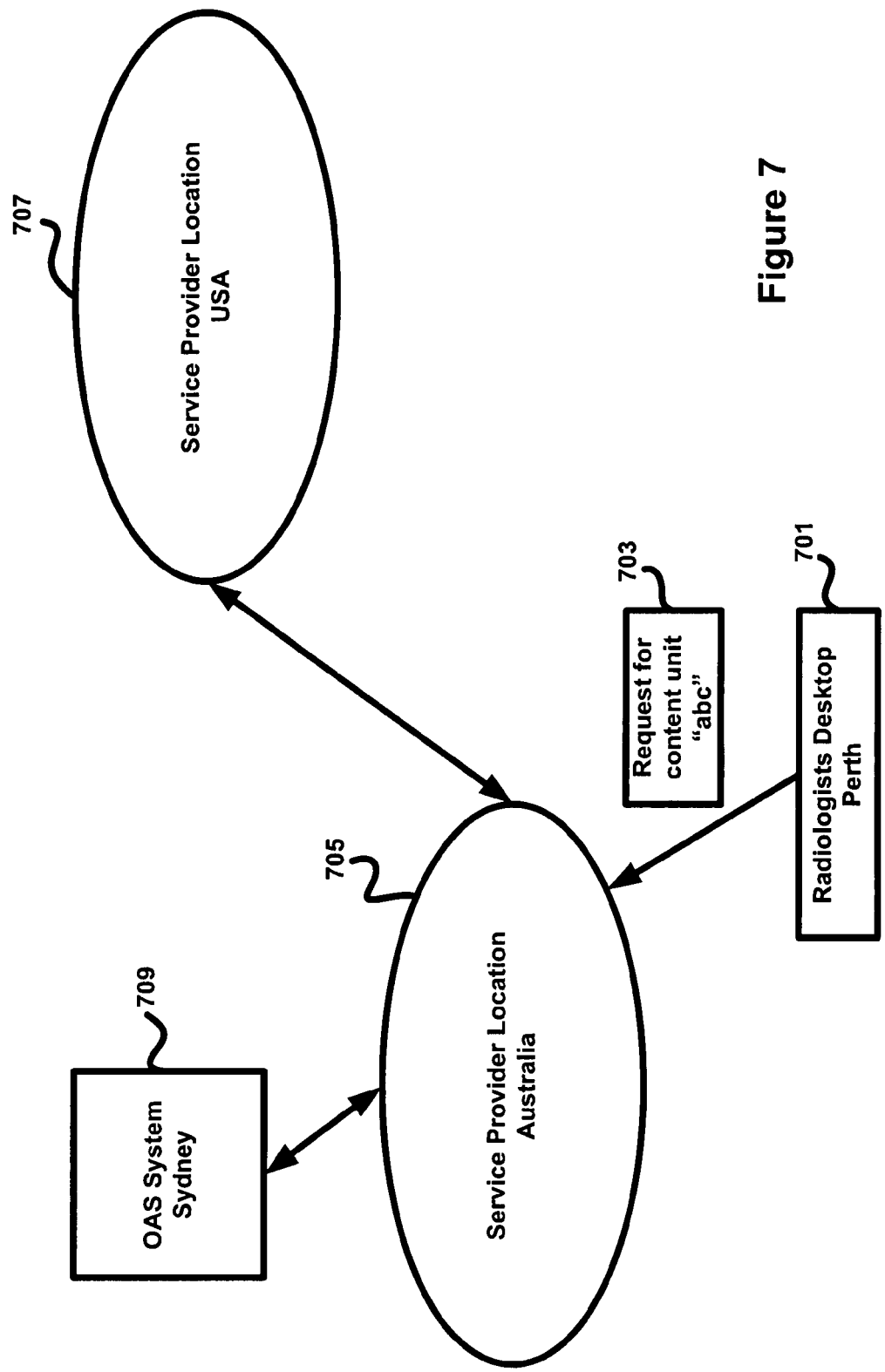
FIG. 7 is a block diagram of a system in which a determination may be made as to which location in a distributed computer system a content unit is to be retrieved based on a management policy and metadata about the content unit, in accordance with some embodiments.

In some embodiments, a score computed from a management policy may be used to determine which copy of a content unit (e.g., which of multiple copies stored in the computer system) to return in response to an access request for the content unit. For example, as shown in FIG. 7, a radiologist in Perth, Australia may issue a request for a content unit having the content identifier "abc" to service provider location 705 in Australia. In response to the request, service provider location 705 may determine the locations in the computer system that store a copy of the content unit and instruct each of these locations to compute a score (e.g., using the management policy and the metadata for the content unit) for returning the content unit. As discussed above, the management policy may use any suitable criterion or criteria in determining the best location from which to return the content unit. For example, the management policy may be set up so that the copy of the content unit that can be retrieved least expensively (in terms of cost in dollars and/or use of system resources) is returned, so that the copy of the content unit that can be returned the fastest is returned, or the copy that best meets some other criterion or combination of criteria is returned. For example, an OAS system at a hospital may be busy servicing other access requests from host computers, such that a service provider location that stores a copy of a content unit stored on the OAS system may process an access request for the content unit faster (even though it may be monetarily more expensive to access the content unit from the service provider location).

In the example of FIG. 7, service provider location 705 may determine that OAS system 709 in Sydney stores a copy of the content unit and that service provider location 707 in the United States stores a copy of the content unit, and may request that each of these locations return its score for retrieving the content unit (e.g., computed using the management policy and the metadata for the content unit). Once the scores are determined, the location with the best (e.g., the highest) score may be selected and the content unit may be retrieved from that location and returned to the requestor.

For example, in FIG. 7, OAS System 709 and service provider location 707 may each send, to service provider location 705, their score for providing the content unit. Service provider 705 may determine which score is the better score and request that the location with the better score send the content unit to it. Once it receives the content unit it may return it to desktop 701 in response to the request.

For example, service provider 705 may determine that the score of service provider 707 is better than that of OAS system 709 and may request the content unit from service provider 707. Upon receiving the content unit from service provider 707, service provider 705 may return it to desktop 701.

In the examples of FIGS. 6 and 7, each available location computes a score and returns the score to a designated location for evaluation (e.g., service provider 603 in FIG. 6 and service provider 705 in FIG. 7) However, the invention is not limited in this respect, as the scores may be computed at any suitable location and need not be computed at the locations at which the content unit is stored. For example, in some embodiments, the scores for each location (or at least some of the locations) may be computed at the same place. For example, in the example of FIG. 7, service provider 705 may compute the score for OAS system 709 and service provider 707 based on the metadata about the content unit and/or information that it may have about these locations (e.g., cost of storage, available bandwidth, etc), or information that these locations send to service provider 705 (e.g., in response to a request for this information from service provider 705).

In addition, in the example of FIG. 6 and FIG. 7 each location used the same management policy to computer a score. However, the invention is not limited in this respect, as each location need not apply the same management policy and need not use the same metadata in computing a score.

The above-described embodiments of the present invention can be implemented on any suitable computer, and a system employing any suitable type of storage system. Examples of suitable computers and/or storage systems are described in the patent applications listed below in Table 2 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 2

| Title | Ser. No. | Filing Date |
| --- | --- | --- |
| Content Addressable Information, | 09/236,366 | Jan. 21, 1999 |

TABLE 2-continued

| Title | Ser. No. | Filing Date |
| --- | --- | --- |
| Encapsulation, Representation, And Transfer | | |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content | 10/911,247 | Aug. 4, 2004 |

TABLE 2-continued

| Title | Ser. No. | Filing Date |
|---|---|---|
| Storage In A Content Addressable Storage System | | |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus | 11/324,533 | Jan. 3, 2006 |
| For Managing A File System On A Content Addressable Storage System | | |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |
| Methods And Apparatus For Transferring Content From A Storage System | 11/392,969 | Mar. 28, 2006 |
| Methods And Apparatus For Requesting Content From A Storage System | 11/391,654 | Mar. 28, 2006 |
| Methods And Apparatus For Transferring Content To Multiple Destinations | 11/392,981 | Mar. 28, 2006 |
| Methods And Apparatus For Receiving Content From A Storage System At Multiple Servers | 11/390,878 | Mar. 28, 2006 |
| Methods And Apparatus For Transferring Content From An Object Addressable Storage System | 11/390,564 | Mar. 28, 2006 |
| Methods And Apparatus For Requesting Content From An Object Addressable Storage System | 11/391,636 | Mar. 28, 2006 |
| Methods And Apparatus For Conversion Of Content | 11/438,770 | May 23, 2006 |
| Methods And Apparatus For Selecting A Data Format For A Content Unit | 11/439,025 | May 23, 2006 |
| Methods And Apparatus For Accessing A Content Unit On A Storage System | 11/439,022 | May 23, 2006 |
| Methods And Apparatus For Enabling Selection Of A Content Unit Data Format | 11/438,817 | May 23, 2006 |
| Methods And Apparatus For Accessing Content | 11/474,658 | Jun. 26, 2006 |
| Methods And Apparatus For Providing Access To Content | 11/474,846 | Jun. 26, 2006 |
| Methods And Apparatus For Retrieving Stored Content | 11/474,655 | Jun. 26, 2006 |
| Methods And Apparatus For Accessing Content Through Multiple Nodes | 11/474,661 | Jun. 26, 2006 |

TABLE 2-continued

| Title | Ser. No. | Filing Date |
|---|---|---|
| Methods And Apparatus For Receiving Content | 11/474,719 | Jun. 26, 2006 |
| Methods And Apparatus For Processing Access Requests | 11/474,749 | Jun. 26, 2006 |
| Methods And Apparatus For Providing Content | 11/474,802 | Jun. 26, 2006 |
| Methods And Apparatus For Managing Content | 11/483,465 | Jul. 10, 2006 |
| Methods And Apparatus For Moving Content | 11/483,799 | Jul. 10, 2006 |
| Methods And Apparatus For Storing Content | 11/483,494 | Jul. 10, 2006 |
| Methods And Apparatus For Caching Content In A Computer System Employing Object Addressable Storage | 11/519,374 | Sep. 12, 2006 |
| Methods And Apparatus For Selection Of A Storage Location For A Content Unit | 11/644,430 | Dec. 22, 2006 |
| Methods And Apparatus For Modifying An Object Identifier For A Content Unit | 11/644,423 | Dec. 22, 2006 |
| Methods And Apparatus For Storing Content On A Storage System | 11/644,174 | Dec. 22, 2006 |
| Methods And Apparatus For Increasing The Storage Capacity Of A Zone Of A Storage System | 11/644,857 | Dec. 22, 2006 |
| Methods And Apparatus For Selecting A Storage Zone For A Content Unit | 11/644,428 | Dec. 22, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system having at least one management policy for managing access to and/or storage of a first content unit based on at least one attribute of the first content unit, the method comprising acts of:
storing, in at least one second content unit in the computer system, metadata that specifies the at least one attribute used to manage access to and/or storage of the first content unit according to the at least one management policy, wherein the content of the second content unit further comprises an object identifier that identifies the first content unit, and wherein the first content unit is stored on at least a first object addressable storage (OAS) system;
accessing the at least one management policy;
accessing the at least one attribute from the second content unit;
using the at least one management policy, at least one attribute of the first OAS system, and the at least one attribute from the second content unit to compute a first score for the first content unit associated with the first OAS system;
providing the first score and the at least one attribute from the second content unit to at least a second OAS system;
receiving, from the at least one second OAS system, an indication of whether a second score for the first content unit associated with the second OAS system is higher than the first score; and
determining, based on the indication, whether to migrate the first content unit to the second OAS system in the computer system.

2. The method of claim 1, wherein the at least one attribute includes at least one of the group consisting of:
a size of the first content unit;
a reproduction cost of the first content unit;
a number of copies of the first content unit that are to exist in the computer system; and
a creation time for the first content unit.

3. The method of claim 1, wherein the first OAS system is a content addressable storage (CAS) system, and wherein the object identifier that identifies the first content unit is a content address that is generated, at least in part, based on at least a portion of the first content unit.

4. The method of claim 1, wherein the first score and the second score are numerical values.

5. At least one non-transitory computer readable medium encoded with instructions that when executed in a computer system having at least one management policy for managing access to and/or storage of a first content unit based on at least one attribute of the first content unit, perform a method comprising acts of:

storing, in at least one second content unit in the computer system, metadata that specifies the at least one attribute used to manage access to and/or storage of the first content unit according to the at least one management policy, wherein the content of the second content unit further comprises an object identifier that identifies the first content unit, and wherein the first content is stored on at least a first object addressable storage (OAS) system;

accessing the at least one management policy;

accessing the at least one attribute from the second content unit;

using the at least one management policy, at least one attribute of the first OAS system, and the at least one attribute from the second content unit to compute a first score for the first content unit associated with the first OAS system;

sending the first score and the at least one attribute from the second content unit to at least a second OAS system;

receiving, from the at least one second OAS system, an indication of whether a second score for the first content unit associated with at least the second OAS system is higher than the first score; and determining, based on the indication, whether to migrate the first content unit to at least the second OAS system in the computer system.

6. The at least one non-transitory computer readable medium of claim 5, wherein the at least one attribute includes at least one of the group consisting of:

a size of the first content unit;

a reproduction cost of the first content unit;

a number of copies of the first content unit that are to exist in the computer system; and a creation time for the first content unit.

7. The at least one non-transitory computer readable medium of claim 5, wherein the first OAS system is a content addressable storage (CAS) system, and wherein the object identifier that identifies the first content unit is a content address that is generated, at least in part, based on at least a portion of the first content unit.

8. In a computer system comprising a plurality of facilities, each comprising an object addressable storage (OAS) system that stores a plurality of content units, each identified via an object identifier that, from the perspective of a host computer that accesses content on the OAS system, is independent of any location at which the content unit is stored, a method of managing at least a first content unit from among the plurality of content units, wherein the plurality of content units further comprises a second content unit that comprises metadata associated with the first content unit and an object identifier for the first content unit, the method comprising acts of:

receiving, at a first of the plurality of facilities, from a second of the plurality of facilities:

a first score associated with the second facility, generated according to a first management policy that manages the first content unit using at least some of the metadata associated with the first content unit; and information usable by the first of the plurality of facilities to generate a second score associated with the first facility according to the first management policy;

using at least the first management policy and the information received from the second facility to compute the second score for the first content unit associated the first facility; and implementing a management decision relating to the first content unit by comparing the first score and the second score.

9. The method of claim 8, wherein each OAS system is a content addressable storage (CAS) system, and wherein the object identifier for each content unit in the plurality of content units is a content address that is generated, at least in part, based on the content unit it identifies.

10. The method of claim 8, wherein the act of implementing the management decision comprises determining whether to migrate the first content unit to the first facility in the OAS system.

11. The method of claim 8, wherein the act of implementing the management decision further comprises determining whether to access the first content unit from the first facility or the second facility, in response to receiving an access request for the first content unit.

12. The method of claim 8, wherein the second score is computed using at least one attribute of the first facility.

13. An object addressable storage (OAS) system that stores a plurality of content units, each identified via an object identifier that, from the perspective of a host computer that accesses content on the OAS system, is independent of any location at which the content unit is stored, that manages at least a first content unit from among the plurality of content units, wherein the plurality of content units further comprises a second content unit that comprises metadata associated with the first content unit and an object identifier for the first content unit, the OAS system comprising:

an input;

a controller, coupled to the input and comprising at least one computer processor, that:

receives, via the input, from another computer:

a first score associated with the other computer generated according to a first management policy that manages the first content unit using at least some of the metadata associated with the first content unit; and information usable by the OAS system to generate a second score associated with the OAS system according to the first management policy; and computes, using at least the first management policy and the information received from the other computer, the second score for the first content unit associated with the OAS system;

implements a management decision relating to the first content unit by comparing the first score and the second score.

14. The OAS system of claim 13, wherein the OAS system is a content addressable storage (CAS) system, and wherein the object identifier for each content unit in the plurality of content units is a content address that is generated, at least in part, based on the content unit it identifies.

15. The OAS system of claim 13, wherein the controller determines whether to migrate the first content unit to a different computer.

16. The OAS system of claim 13, wherein the other computer is a first computer, and wherein the controller determines whether to access the first content unit from the first computer or a second computer.

17. The OAS system of claim 16, wherein the second computer is the OAS system.

18. The OAS system of claim 13, wherein the second score is computed using at least one attribute of the OAS system.

19. A method of managing a content unit in a computer system comprising a plurality of storage devices, the computer system having at least one management policy for managing access to and/or storage of a first content unit based on at least one attribute of the first content unit, the method comprising acts of:
- receiving, at a second storage device from a first storage device, a first score associated with the first storage device and a request to compute a second score associated with the second storage device for performing a management task related to the first content unit;
- accessing the at least one management policy;
- accessing a second content unit to determine the at least one attribute of the first content unit, wherein the content of the second content unit comprises an object identifier that identifies the first content unit;
- using the at least one management policy and the at least one attribute to compute the second score; and
- determining whether to perform the management task at the first storage device or the second storage device based on a comparison of the first score and the second score.

20. The method of claim 19, further comprising an act of:
returning the second score in response to the request.

21. The method of claim 19, wherein the at least one attribute includes at least one of the group consisting of:
- a size of the first content unit;
- a reproduction cost of the first content unit;
- a number of copies of the first content unit that are to exist in the computer system; and
- a creation time for the first content unit.

22. The method of claim 19, wherein the object identifier for the first content unit is a content address that is generated, at least in part, using at least a portion of the content of the first content unit.

23. The method of claim 19, wherein the management task comprises at least one of the group consisting of:
- storing the first content unit; and
- returning the first content unit.

24. The method of claim 19, wherein the second score is computed using at least one attribute of second storage device.

* * * * *